United States Patent [19]

Mihara et al.

[11] Patent Number: 4,971,488

[45] Date of Patent: Nov. 20, 1990

[54] TABLE SLIDING APPARATUS FOR GEAR FINISHING MACHINES

[75] Inventors: Toshihide Mihara, Amagasaki; Ryoji Yoshida, Suita, both of Japan

[73] Assignee: Kanzaki Kokyukoki Mfg. Co., Ltd., Amagasaki, Japan

[21] Appl. No.: 335,271

[22] Filed: Apr. 10, 1989

[30] Foreign Application Priority Data

Jun. 9, 1988 [JP] Japan ................. 63-142402

[51] Int. Cl.$^5$ ............................................... B23F 5/00
[52] U.S. Cl. ...................................... 409/41; 74/89.15; 269/71; 409/219
[58] Field of Search ............. 409/219, 41, 56, 57; 408/234, 237; 51/240 R, 240 A, 115, 114, 113, 121, 122, 124 R, 44–46, 939, 646.5; 269/73, 71; 74/89.15, 424.8 R; 108/143

[56] References Cited

U.S. PATENT DOCUMENTS

| | | | |
|---|---|---|---|
| 1,032,933 | 7/1912 | O'Brien | 408/115 X |
| 1,443,899 | 1/1923 | Kusold | 409/219 X |
| 1,931,730 | 10/1933 | Klay | 408/237 X |
| 2,612,080 | 9/1952 | Davis . | |
| 2,957,362 | 10/1960 | Kelm | 409/219 X |

FOREIGN PATENT DOCUMENTS 275197 12/1952 Japan .
54-21036 7/1979 Japan .

*Primary Examiner*—Z. R. Bilinsky
*Assistant Examiner*—R. Schultz

[57] ABSTRACT

A first table (1) slidable leftwards and rightwards of a gear finishing machine and a second table (2) slidable forwards and rearwards of the machine are disposed in an overlapped relationship such that one of the tables is mounted on the top of the other table. Of these tables, the upper table is guided by a horizontal guide member (3) which is adapted to be rotated to any desired angular position and to be clamped at such position. A feed motor (5) drives the first table to slide.

For sliding the table assembly along a diagonal direction, the angular position of the guide member is adjusted so that it extends along such direction.

A horizontal stability of the table assembly is secured without employing a conventional parallel link mechanism. The table assembly is driven to slide so as to pass the center of machine so that an accuracy of gear finishing is assured.

12 Claims, 7 Drawing Sheets

TABLE SLIDING APPARATUS FOR GEAR FINISHING MACHINES

FIELD OF THE INVENTION

This invention relates to a table sliding apparatus for providing horizontal sliding movement to a table of a gear finishing machine, such as gear shaving machine, during a gear finishing process of a work gear supported by the table.

BACKGROUND OF THE INVENTION

For permitting to finish a work gear by sliding a table, supporting the gear, horizontally under a condition where the work gear is engaged with a gear-finishing tool such as shaving cutter from a diagonal direction, table assembly of a conventional gear finishing machine is fashioned as shown, for example, in Japanese Patent Publication No. 54-21036, to include not only a sliding table, mounted slidably leftwards and rightwards of the machine and driven to slide by a feed motor, but a rotatable table supported rotatably about a vertical axis or center of the machine.

Such rotatable table is fashioned to be clamped to the sliding table or to a knee portion of the machine by a releaseable clamp means and, prior to a gear finishing operation, it is oriented or rotated at an unclamped condition thereof to a required angular position using a table rotating means and, then, is re-clamped.

As well known, this kind of table mechanism which permits to slide a work table diagonally by a combination of a sliding table and rotatable table requires a parallel link mechanism for securing a parallelism of the rotatable table relative to the sliding table so as to assure a horizontal stability of the whole of table assembly (see, for example, Japanese Patent Publication No.27-5197-). Because of an accuracy required, such parallel link mechanism is quite expensive.

For eliminating the parallel link mechanism, a structure is considered in that combination of a pair of sliding tables, one of which is slidable leftwards and rightwards of a gear finishing machine and the other of which is slidable forwards and rearwards of the machine, is employed and such pair of sliding tables are driven to slide at a same time under a control using a NC (numerical control) apparatus so as to slide a work table diagonally. However, this structure requires a pair of feed motors for driving the pair of sliding tables and two sets of feed mechanisms disposed between respective tables and motors so that such structure can hardly be said to be more inexpensive than the conventional structure comprising a parallel link mechanism. Further, because diagonal sliding movement of a work table is attained by independently driving two sliding tables, it is not assured that the work table crosses or passes a center of the machine during such diagonal sliding movement. Consequently, there remains a problem in accuracy of gear finishing.

Accordingly, a primary object of the present invention is to provide a novel table sliding apparatus for gear finishing machines in which combination of a pair of sliding tables is employed in a fashion such that diagonal sliding movement is attained by a single feed motor so as to eliminate problems set forth above.

BRIEF DESCRIPTION OF THE DRAWINGS

In the accompanying drawings.

SUMMARY OF THE INVENTION

Figure 7:
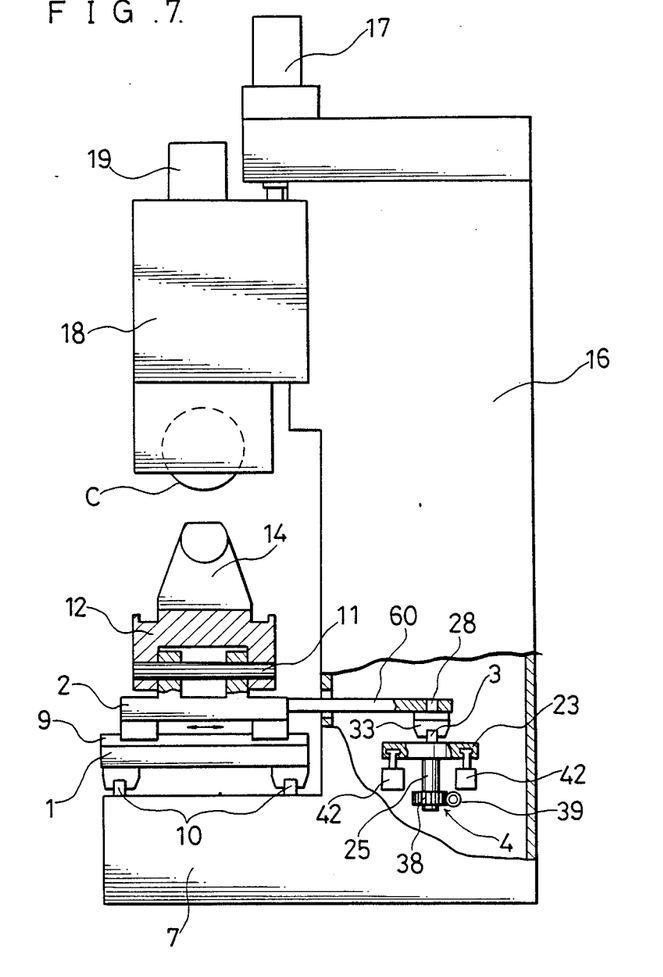
FIG. 7 is a schematic side view, partially in section, of a gear finishing machine in which a second embodiment of the table sliding apparatus according to the present invention is employed.
Figure 8:
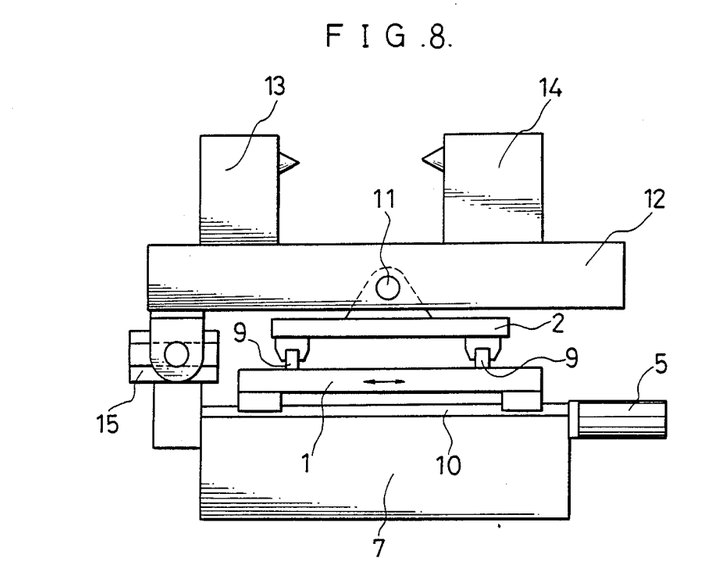
FIG. 8 is a schematic front view showing a lower half of the gear finishing machine shown in FIG. 7.
Figure 9:
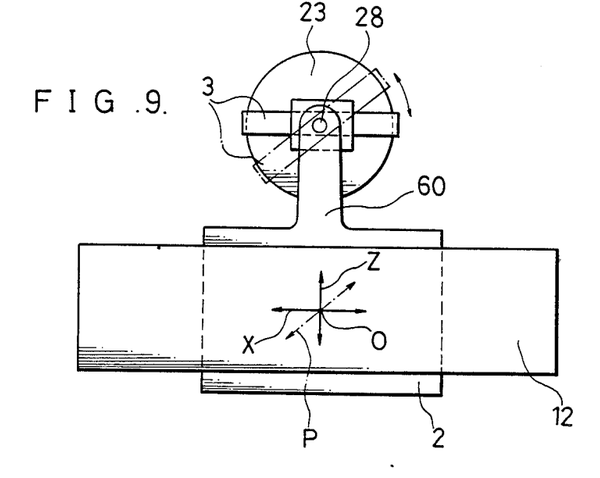
FIG. 9 is a schematic plan view showing some members of the second embodiment.

In a gear finishing machine shown, respectively, in FIGS. 1 to 6 and in FIGS. 7 to 9, the table sliding apparatus according to the present invention comprises first and second sliding tables 1 and 2. The first table 1 is mounted for horizontal sliding movement along a first horizontal axis X (FIG. 3 and FIG. 9) which extends leftwards and rightwards of the machine, whereas the second table 2 is mounted for horizontal sliding movement along a second horizontal axis Z (FIG. 3 and FIG. 9) which extends forwards and rearwards of the machine. The first and second axes X and Z set forth above are perpendicular to each other and pass a point O (FIG. 3 and FIG. 9) on a vertical center axis of the machine.

One of the first and second tables 1 and 2 is mounted for horizontal sliding movement thereof on the top of the other table. As depicted, the first table 1 is mounted on the top of the second table 2 in the first embodiment shown in FIGS. 1 to 6, whereas the second table 2 is mounted on the top of the first table 2 in the embodiment shown in FIGS. 7 to 9.

A horizontal guide member 3 is provided for guiding one of the tables, which is slidably mounted on the top of the other table, during horizontal sliding movement of such one table. This guide member 3 is supported for horizontal rotation about a center of rotation located on the second horizontal axis Z and is clamped non-rotatably by a releaseable clamp means 42.

The apparatus according to the present invention further comprises, a rotating means 4 for rotating the guide member 3 at an unclamped condition thereof and a feed motor 5 for driving the first table 1 to slide.

Figure 3:
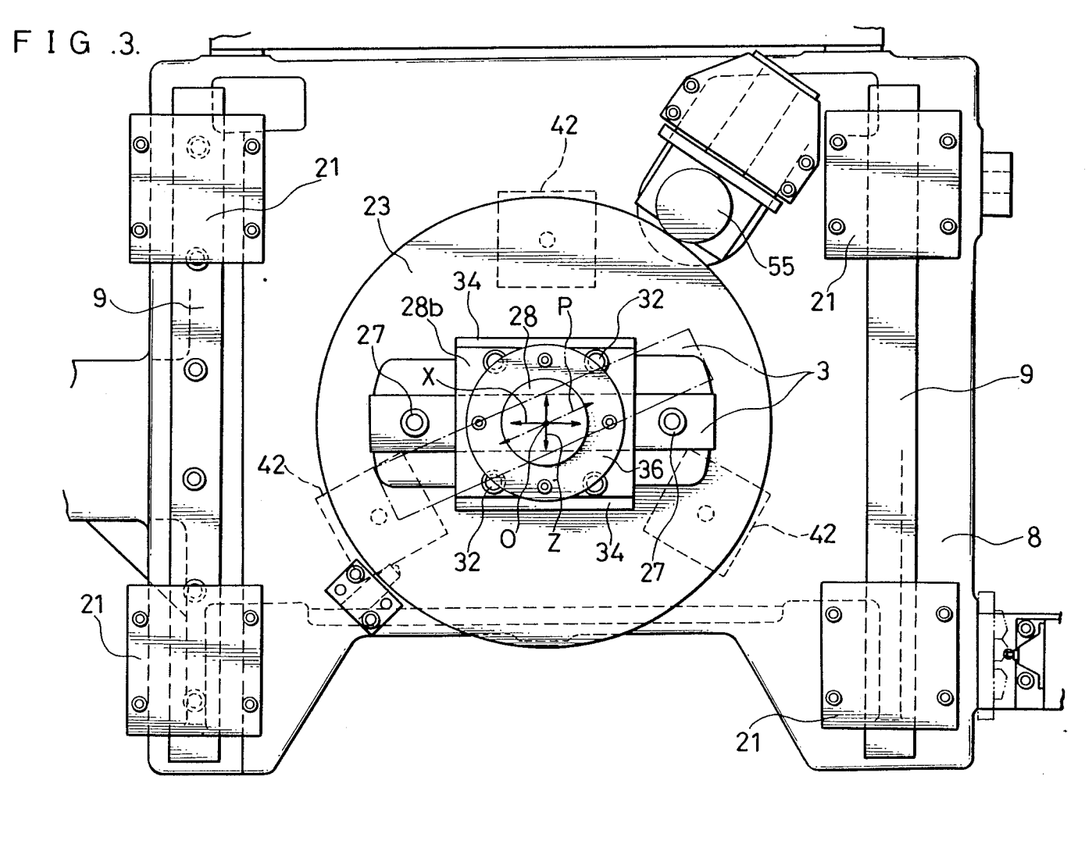
FIG. 3 is a plan view showing an upper face portion of a knee employed in the gear finishing machine shown in FIGS. 1, 2A and 2B.

The table sliding apparatus according to the present invention operates as follows:

When the first table 1 is driven to slide by the feed motor 5 under a condition such that the guide member 3 is placed in an angular position where it extends parallel with the first horizontal axis X, as shown respectively in FIG. 3 and in FIG. 9, the second table 2 which is mounted slidably forwards and rearwards of the machine along the second horizontal axis Z is kept unmoved relative to the first table 1 so that both of the tables 1 and 2 are moved in unison along the first horizontal axis X.

On the contrary, when the first table 1 is driven to slide by the feed motor 5 under a condition such that the guide member 3 is placed in an angular position where it extends diagonally with respect to the first horizontal axis X, as shown in phantom, respectively, in FIG. 3 and in FIG. 9, the upper table (i.e. in case of FIG. 3, the first table 1 which does not appear in FIG. 3; and in case of FIG. 9, the second table 2) is moved along a direction shown with arrow P, which direction is parallel to the guide member 3, while sliding relative to the lower table because such upper table cannot slide along any direction other than the direction of arrow P.

When the table assembly is driven to slide along any of the directions of arrows X and P, the upper table will necessarily pass the intersection of two horizontal axes X and Z, namely the center of machine O.

The table sliding apparatus according to the present invention may be manufactured with a low cost. This is because one of the first and second tables slidable horizontally along perpendicular directions is mounted for its horizontal sliding movement on the other table and is guided for performing its horizontal sliding movement along a diagonal direction by a separate horizontal guide member 3 so that a horizontality of the whole of table assembly is secured by the first and second tables 1 and 2 themselves, which are moved only to slide horizontally, and, therefore, an expensive parallel link mechanism is not required, and because only one feed motor 5 which drives the first table 1 to slide is provided for the two sliding tables 1 and 2 so that respective ones of a pair of feed motors and two sets of feed mechanisms to be employed in the numerically controlled table mechanism referred to before are eliminated.

Another advantage of the present invention consists in a fact that an accuracy of gear finishing is assured notwithstanding the employment of two sliding tables 1 and 2. This is because the first table 1 is driven to slide horizontally under a condition such that one of the two tables slidable along perpendicular directions is supported for its horizontal sliding movement by the other table, so that the table assembly is necessarily moved even during diagonal sliding movement thereof so as to pass the center of machine whereby a work gear supported by the table assembly is necessarily moved without causing a deviation from the center of a gear-finishing tool such as shaving cutter.

DESCRIPTION OF PREFERRED EMBODIMENTS

Figure 4:
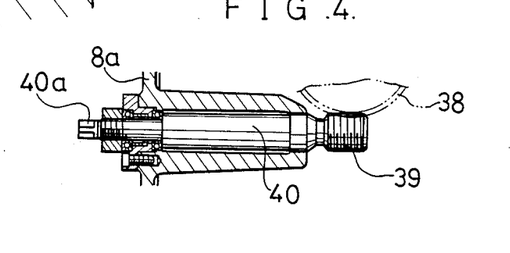
FIG. 4 is a cross-sectional plan view of a part of the gear finishing machine set forth above.
Figures 5, 6:
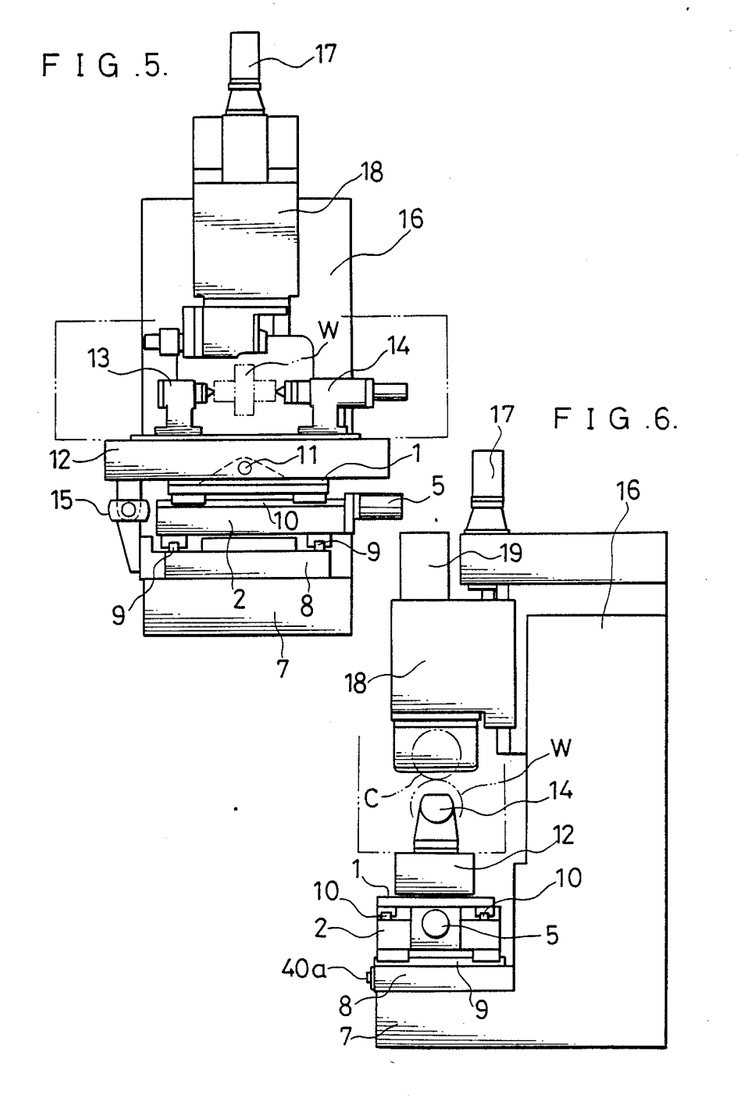
FIG. 5 is a front view of the gear finishing machine in which the first embodiment is employed.
FIG. 6 is a side view of the gear finishing machine set forth above.

FIGS. 1 to 6 depict a first embodiment employed in a gear finishing machine the whole of which is shown in FIGS. 5 and 6. The machine shown is fashioned as a gear shaving machine.

Table mechanism which is supported by a knee 8 on a bed 7 comprises the second table 2, set forth before, which is guided by a pair of rails 9 on the knee 8 so as to be slidable forwards and rearwards of the machine, the first table 1, set forth before, which is guided by a pair of rails 10 on the second table 2 so as to be slidable leftwards and rightwards of the machine, and a work table 12 which is supported by the first table 1 for rocking movement relative thereto about a horizontal pivot shaft 11 extending forwards and rearwards of the machine. The work table 12 carries left and right stocks 13 and 14 for supporting a work gear W. To one side of the table mechanism is associated a crowning guide 15 operable to guide the work table 12 for rocking movement when crowning is applied to the work gear or the teeth thereof.

Bed 7 has at a rear side thereof an integral upstanding column 16 which supports a vertically slidable cutter head 18. This cutter head 18 which is lifted and lowered by a motor 17 comprises a shaving cutter C, fixedly mounted on a tool spindle (not shown), which in turn is driven to rotate by a spindle-driving motor 19.

Figure 1:
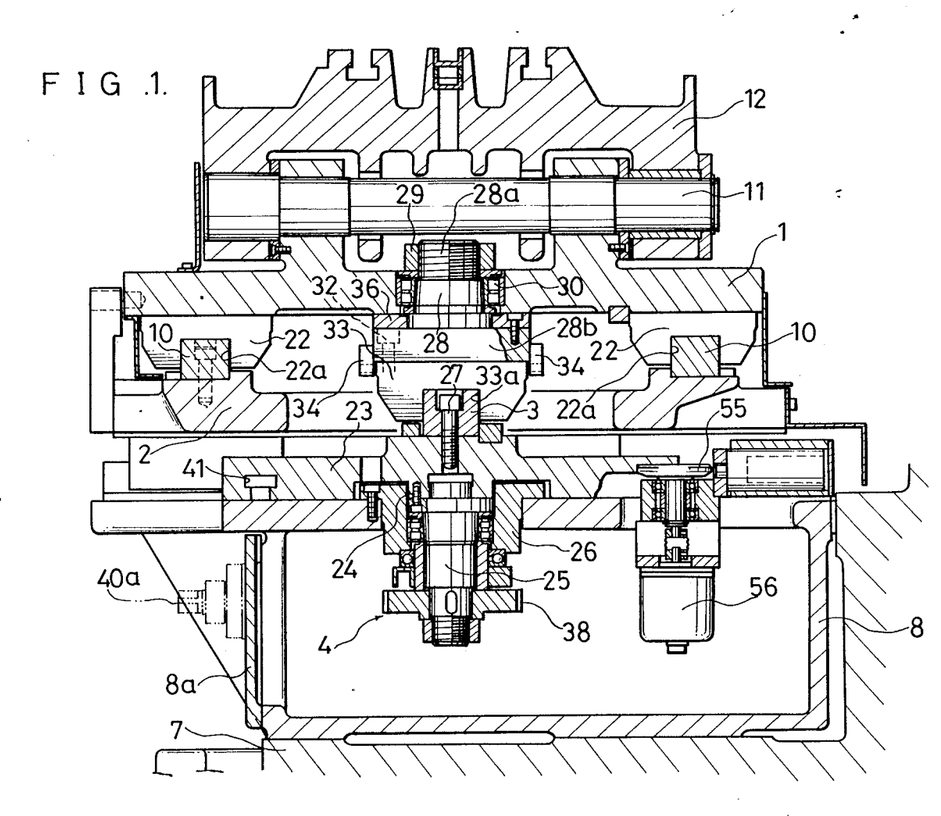
FIG. 1 is a sectional side view of a part of a gear finishing machine in which a first embodiment of the table sliding apparatus according to the present invention is employed.
Figure 2A:
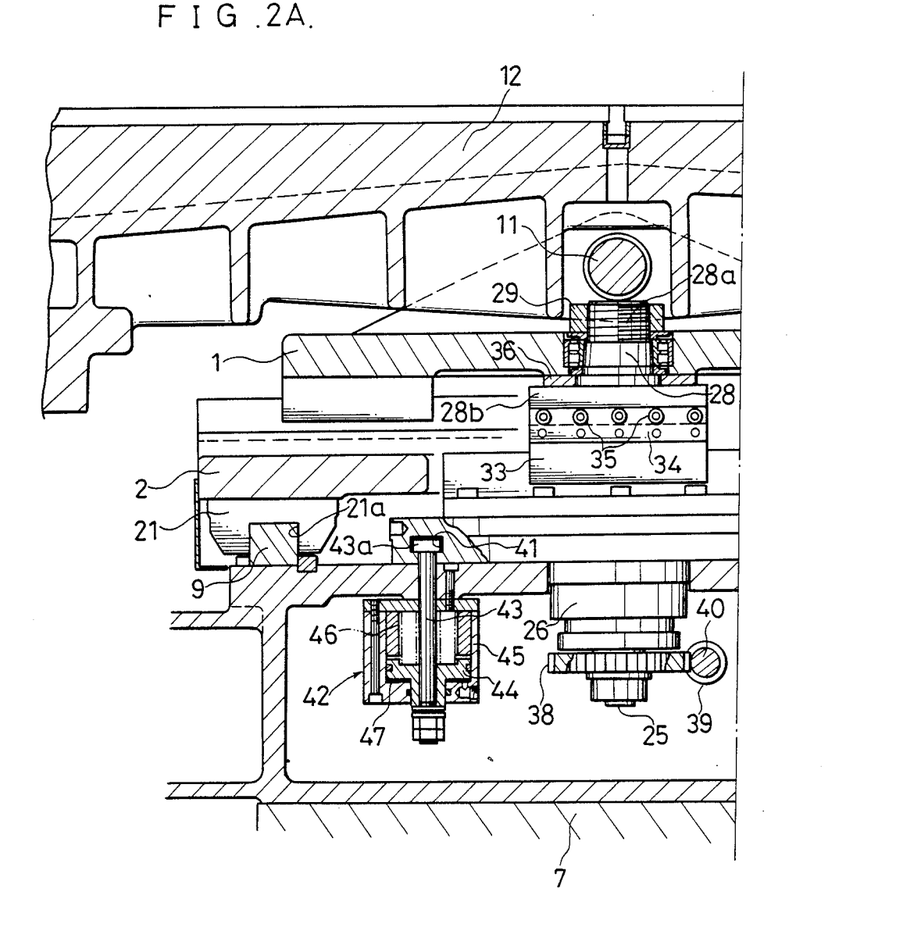
FIG. 2A and FIG. 2B are sectional front views showing, respectively, a left half and right half of the part of gear finishing machine shown in FIG. 1.
Figure 2B:
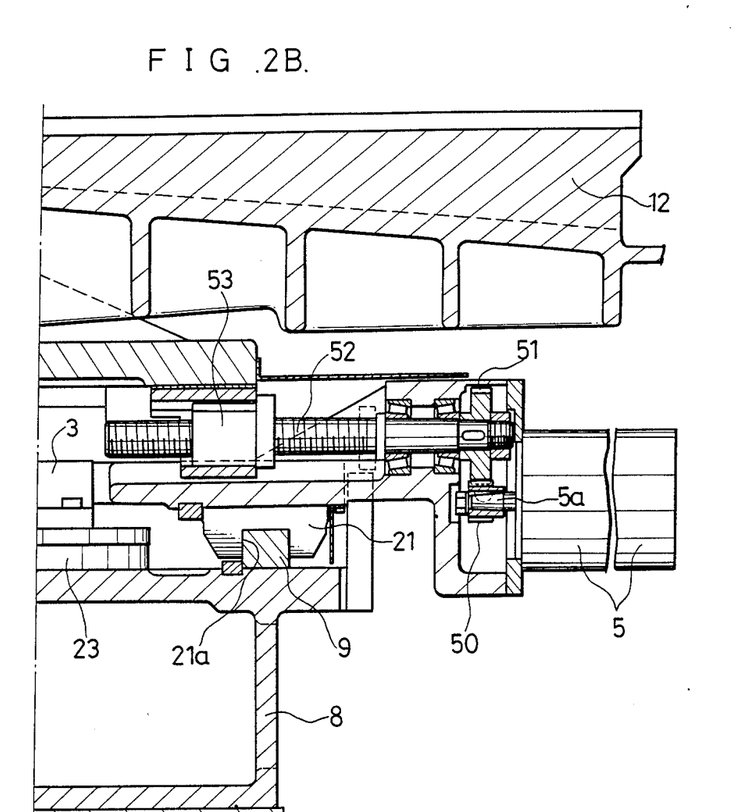

As shown in FIGS. 1 to 3, the rails 9 and 10 are fixed respectively to the upper faces of the knee 8 and second table 2 and are fitted respectively in rail-receiving grooves 21a and 22a of leg members 21 and 22, which in turn are fixed respectively to the lower faces of the second table 2 and first table 1, so as to slidably receive the respective tables 2 and 1.

As also shown in FIGS. 1 to 3, a circular disk 23 having its center on the vertical center axis of machine is disposed on a central portion of the upper face of the knee 8. This disk 23 has a vertical support shaft 25, attached to the lower face to the disk at a center portion thereof using screws 24, which is received rotatably through a bearing means by a hollow cylindrical support member 26 fixedly- secured to a top wall of the knee 8. The disk 23 is thus supported rotatably about the vertical center axis of machine. The horizontal guide member 3 set forth before is fashioned to a rail of a relatively small length having a longitudinal axis parallel to a diametrical line of the disk 23 and is fixedly secured to the disk 23 using a pair of threaded fasteners 27.

The first table 1 supports at a central portion thereof a rotatable support shaft 28 through a bearing means 30. This support shaft 28 is prevented from getting-away by a nut 29 threadingly engaged to a threaded upper end portion 28a of the shaft and includes at its lower end an integral rectangular plate portion 28b. To the lower face of the plate portion 28b is fixedly secured using screws 32 a guide-receiving member 33 which is formed with a receiving groove 33a having an open lower end. The guide member 3 is fittingly received in the groove 33a for relative sliding movement between the members 3 and 33. A pair of plates 34 which sandwich an upper end portion of the guide-receiving member 33 are attached to the rectangular plate portion 28b using screws 35. To the upper face of the plate portion 28b is attached a ring-shaped bearing plate 36 which is in a slidable engagement with the lower face of the first table 1. As can be seen from FIG. 1 and FIGS. 2A and 2B, the second table 2 includes a central bore having a relatively large diameter within which the guide member 3 and guide-receiving member 33 extend.

As the guide-receiving member 33 set forth above, a commercially available guide means called "LM (linear motion) guide" may satisfactorily be used which includes balls to be engaged rotatably with the guide member 3. A rail means called "LM rail" having guide faces for the balls is also available in the market and may be used as the guide member 3.

As shown in FIGS. 1, 2A and 4, the aforestated means 4 for rotating the guide member 3 comprises a worm gear 38, fixedly mounted on a lower end portion of the support shaft 25 of the disk 23, and a worm 39 meshing with the worm gear 38. The worm 39 is formed integrally on a control shaft 40 which extends through and is supported rotatably by a front cover 8a of the knee 8 and has a squared outer end 40a for fittingly engaging a hand tool.

As shown in FIGS. 1, 2A and 2B, the disk 23 is formed with a circular T-slot 41 at which the disk 23 is clamped non-rotatably by a clamp means 42, disposed within the knee 8, so as to fix the angular position of the guide member 3. Three of such clamp means 42 are provided, as shown in FIG. 3, and each of these clamp means includes a clamp pin 43 shown in FIG. 2A having a clamping head 43a which is disposed within the T-slot 41. To the lower face of the top wall of knee 8 is fixedly secured a cylinder 45 having therein a piston 44 which is moved vertically in unison with the clamp pin 43. Within the cylinder 45 is disposed a spring 46 which forces the piston 44 and clamp pin 43 to move downwardly so as to clamp the disk 23 by means of clamping head 43a. The clamp means 42 is fashioned such that clamping of the disk 23 is released when fluid under pressure is supplied into a fluid chamber 47 below the piston 44 so as to move the piston 44 and clamp pin 43 upwardly.

As shown in FIG. 2B, the feed motor 5 set forth before is attached to a side end of the second table 2 and includes a motor shaft 5a carrying thereon a smaller gear 50. Between the first and second tables 1 and 2 is disposed a laterally extending feed screw 52 which carries at a base end portion thereof a larger gear 51 meshing with the smaller gear 50. The feed screw 52 is threadingly engaged with a nut member 53 non-rotatably secured to the lower face of the first table so that the feed screw operates to slide the first table 1 when the screw is driven to rotate by the motor 5 with a reduced speed of rotation.

As shown in FIGS. 1 and 3, a rotary encorder 56 is provided which is driven to rotate by a friction wheel 55 engaging the disk 23 frictionally. This encorder 56 which is disposed within the knee 8 is used for detecting the rotational position of the disk 23 and, therefore, the angular position of the guide member 3.

When, by way of example, a diagonal shaving process is performed with respect to a work gear using the gear shaving machine shown in FIGS. 5 and 6, the table assembly is driven to slide in a manner such that gear W meshing with the shaving cutter C is moved so as to cross the center of cutter C diagonally.

Accordingly, clamping of the disk 23 by the clamp means 42 is once released prior to such gear-finishing process and, then, the control shaft 40 is operated at its outer end 40a to rotate so as to rotate the disk 23 together with the support shaft 25 through the worm 39 and worm gear 38 into a rotational position where the guide member 3 is oriented towards a desired direction along which the table assembly or the work table 12 thereof is to be moved. Then the disk 23 is re-clamped using the clamp means 42.

During a gear-finishing process performed by providing horizontal sliding movement along a diagonal direction to the table assembly, relative sliding movement between the first and second tables 1 and 2 is attained in a smooth manner without any distortion of the elements because the guide-receiving member 33 having the receiving groove 33a turns freely in unison with the rotatable support shaft 28 thereon so as to vary the direction or horizontal posture thereof freely. Such smoothness with respect to relative sliding movement between the first and second tables is further enhanced when a LM guide referred to before is used as the guide-receiving member 33 shown.

FIGS. 7 to 9 depict schematically a second embodiment in which the second table 2 is mounted on the top of the first table 1, as described before. In this embodiment a pair of rails 10 for guiding the first table 1 are fixedly disposed on a bed 7, whereas another pair of rails 9 for guiding the second table 2 are fixedly disposed on the first table 1. A work table 12 is supported for rocking movement by the second table 2 through a pivot shaft 11.

As shown in FIG. 7, an arm 60 attached to the second table 2 and having a longitudinal axis coincident with the second horizontal axis (Z of the machine extends into a column 16 through an opening in a front wall of the column 16. Within the column 16 is arranged a horizontally rotatable disk 23, similar to the disk 23 employed in the first embodiment, which is secured to a top end of a vertical support shaft 25. The support shaft 25 is journalled rotatably and is operated to rotate by a rotating means 4 similar to that employed in the first embodiment. The guide member 3 set forth before is fixedly secured to the upper face of the disk 23. A guide-receiving member 33 similar to that employed in the first embodiment is supported by an end portion of the arm 60 rotatably about a vertical support shaft 28 and is engaged with the guide member 3 so as to permit relative sliding movement therebetween. As shown in FIG. 8, the feed motor 5 set forth before is fixedly mounted on an end face of the bed 7 for driving the first table 1 to slide. The other parts of the second embodiment are fashioned similarly to the corresponding parts of the first embodiment and are designated by like numerals.

As already described before, the table assembly according to this embodiment may also be driven to slide along a desired diagonal direction as well as along the left and right direction.

We claim:

1. In a gear finishing machine having a first horizontal axis extending leftwards and rightwards of the machine and a second horizontal axis is extending forwards and rearwards of the machine, said first and second horizontal axes being perpendicular to each other and passing a point on a vertical center axis of the machine, a table sliding apparatus which comprises:

a first table (1) mounted for horizontal sliding movement along said first horizontal axis;

a second table (2) mounted for horizontal sliding movement along said second horizontal axis
one of said first and second tables being mounted for horizontal sliding movement thereof on the top of the other of said tables;

guide means comprising a horizontal guide member (3) in sliding engagement with said one table for guiding said one table during horizontal sliding movement thereof, said guide member being supported for rotation about a center of rotation located on said second horizontal axis and being clamped non-rotatably by a releasable clamp means;

a rotating means (4) for rotating said guide member at an unclamped condition thereof to adjust the direction of horizontal sliding movement of said one table; and a feed motor (5) drivably connected to said first table for driving said first table to slide.

2. A table sliding apparatus as claimed in claim 1, wherein a rotatable member (33) is supported by said one table (1; 2) such that said rotatable member is slidable in unison with said one table but is rotatable about its own vertical axis relative to said one table, said guide member (3) being engaged with said rotatable member so as to guide said one table through said rotatable member.

3. A table sliding apparatus as claimed in claim 1, wherein said guide member (3) is fixedly supported by a horizontal disk (23) which is mounted for rotation about said center of rotation of said guide member, said disk being adapted to be clamped by said clamp means (42) and to be rotated by said rotating means (4).

4. A table sliding apparatus as claimed in claim 1, wherein said first table (1) is mounted on the top of said second table (2), said center of rotation of said guide member (3) being located on said vertical center axis of the machine.

5. A table sliding apparatus as claimed in claim 1, wherein said second table (2) is mounted on the top of said first table (1), said second table comprising a horizontal arm (60) extending therefrom and having a longitudinal axis coincident with said second horizontal axis, said guide member (3) being adapted to guide said second table through said horizontal arm.

6. In a gear cutting machine having a first horizontal direction extending leftwards and rightwards of the machine and a second horizontal direction extending forwards and rearwards of the machine, a table traversing apparatus comprising a first horizontal table (1) mounted for traversing along said first horizontal direction, a second horizontal table (2) mounted for traversing along said second horizontal direction, one of said tables being mounted for traversing on top of and relative to the other of said tables, said two horizontal directions being transverse to each other, guide means comprising a horizontal guide member (3) in engagement with the upper one of said tables for guiding said upper one of said tables during horizontal traversing thereof, said guide member (3) being angularly adjustable about a vertical axis to adjust the direction of traversing movement of said upper one of said tables, a releasable clamp (42) for preventing rotation of said guide member (3) when clamped, means (4) for angularly adjusting said guide member (3) when unclamped, and a feed motor (5) drivably connected to one of said tables for driving said one of said tables to traverse.

7. A table traversing apparatus according to claim 6 wherein said first and second horizontal directions are mutually perpendicular.

8. A table traversing apparatus according to claim 6 for a gear finishing machine wherein said first horizontal direction extends from left to right of the machine.

9. A table traversing apparatus according to claim 6 wherein a guide follower (33) which is rotatably supported by the upper one of said tables so as to be traversable in unison with said table but rotatable about its vertical axis relative to said table, said guide follower (33) being traversably engaged with said horizontal guide member (3) so as to guide the upper one of said tables during horizontal traversing thereof.

10. A table traversing apparatus according to claim 6 wherein said guide member (3) is fixedly supported by a horizontal disk (23) rotatably mounted for rotation about the vertical axis of rotation of said guide member (3) said disk (23) being adapted to be clamped by said releasable clamp (42) and to be rotated by said angular adjusting means (4).

11. A table traversing apparatus according to claim 6 wherein said first table (1) is mounted on top of said second table (2).

12. A table traversing apparatus according to claim 9 wherein said second table (2) is mounted on top of said first table (1), and said second table (2) comprises a horizontal arm (60) extending therefrom in said second horizontal direction, said guide following member (33) being mounted at the end of said horizontal arm (60) and said guide member (3) being adapted to guide said second table (2) by means of said horizontal arm (60).

* * * * *